(12) United States Patent
Chhaparwal et al.

(10) Patent No.: US 8,730,241 B2
(45) Date of Patent: May 20, 2014

(54) TECHNIQUES FOR DRAWING CURVED EDGES IN GRAPHS

(75) Inventors: Gaurav Chhaparwal, Rajasthan (IN); Navin Doshi, Bangalore (IN); Kashyap Babu Rao Kolipaka, Bangalore (IN)

(73) Assignee: Fair Isaac Corporation, San Jose, CA (US)

( * ) Notice: Subject to any disclaimer, the term of this patent is extended or adjusted under 35 U.S.C. 154(b) by 643 days.

(21) Appl. No.: 12/206,687

(22) Filed: Sep. 8, 2008

(65) Prior Publication Data
US 2010/0060642 A1 Mar. 11, 2010

(51) Int. Cl.
*G06T 11/20* (2006.01)
(52) U.S. Cl.
USPC .......................................................... 345/440
(58) Field of Classification Search
CPC ...... G06T 11/206; G06T 11/203; G06T 11/20
USPC ................................. 345/440–443
See application file for complete search history.

(56) References Cited

U.S. PATENT DOCUMENTS

| | | | |
|---|---|---|---|
| 4,953,106 A * | 8/1990 | Gansner et al. | 345/440 |
| 5,515,487 A | 5/1996 | Beaudet et al. | |
| 5,528,735 A | 6/1996 | Strasnick et al. | |
| 5,537,630 A | 7/1996 | Berry et al. | |
| 5,546,529 A | 8/1996 | Bowers et al. | |
| 5,603,025 A | 2/1997 | Tabb et al. | |
| 5,608,898 A | 3/1997 | Turpin et al. | |
| 5,623,541 A | 4/1997 | Boyle et al. | |
| 5,644,686 A | 7/1997 | Hekmatpour | |
| 5,682,487 A | 10/1997 | Thomson | |
| 5,692,107 A | 11/1997 | Simoudis et al. | |
| 5,696,885 A | 12/1997 | Hekmatpour | |
| 5,701,137 A | 12/1997 | Kiernan et al. | |
| 5,701,400 A | 12/1997 | Amado | |
| 5,710,896 A | 1/1998 | Seidl | |
| 5,720,007 A | 2/1998 | Hekmatpour | |
| 5,742,836 A | 4/1998 | Turpin et al. | |

(Continued)

FOREIGN PATENT DOCUMENTS

| | | |
|---|---|---|
| EP | 0690367 | 1/1996 |
| EP | 0717346 | 6/1996 |

(Continued)

OTHER PUBLICATIONS

Fekete et al. "Excentric Labling: Dynamic Neighborhood Labeling for Data Visualization," ACM 1999.

(Continued)

*Primary Examiner* — James A Thompson
*Assistant Examiner* — Peter Hoang
(74) *Attorney, Agent, or Firm* — Mintz Levin Cohn Ferris Glovsky and Popeo, P.C.

(57) ABSTRACT

A system and method for drawing curved edges in graphs is disclosed. The system and method implement a heuristic algorithm to draw curved edges in graphs using Bezier curves. The algorithm assumes that every pair of nodes has a unique edge between them. It also assumes that the graph is "leveled," which means the nodes can be grouped such that all the nodes in a group are laid out at the same y location in a vertical layout. Any generic graph can be converted to a leveled graph, so the techniques described in the algorithm are applicable to any graph.

14 Claims, 3 Drawing Sheets

(56) References Cited

U.S. PATENT DOCUMENTS

| | | | |
|---|---|---|---|
| 5,745,712 | A | 4/1998 | Turpin et al. |
| 5,787,416 | A | 7/1998 | Tabb et al. |
| 5,796,932 | A | 8/1998 | Fox et al. |
| 5,806,056 | A | 9/1998 | Hekmatpour |
| 5,806,256 | A | 9/1998 | Hekmatpour |
| 5,815,155 | A | 9/1998 | Wolfston, Jr. |
| 5,815,415 | A | 9/1998 | Bentley et al. |
| 5,818,155 | A | 10/1998 | Kawamura et al. |
| 5,822,745 | A | 10/1998 | Hekmatpour |
| 5,870,559 | A | 2/1999 | Lesham et al. |
| 5,870,768 | A | 2/1999 | Hekmatpour |
| 5,875,431 | A | 2/1999 | Heckman et al. |
| 5,890,131 | A | 3/1999 | Ebert et al. |
| 5,917,492 | A | 6/1999 | Bereiter et al. |
| 5,920,873 | A | 7/1999 | Van Huben et al. |
| 5,930,764 | A | 7/1999 | Melchione et al. |
| 5,953,017 | A | 9/1999 | Beach et al. |
| 5,953,707 | A | 9/1999 | Huang et al. |
| 5,958,008 | A | 9/1999 | Pogrebisky et al. |
| 5,966,126 | A | 10/1999 | Szabo |
| 5,966,695 | A | 10/1999 | Melchione et al. |
| 5,974,127 | A | 10/1999 | Wernli et al. |
| 5,982,370 | A | 11/1999 | Kamper |
| 5,987,242 | A | 11/1999 | Bentley et al. |
| 5,999,192 | A | 12/1999 | Selfridge et al. |
| 6,014,138 | A | 1/2000 | Cain et al. |
| 6,073,138 | A | 6/2000 | de l'Etraz et al. |
| 6,078,324 | A | 6/2000 | Phathayakorn et al. |
| 6,088,693 | A | 7/2000 | Van Huben et al. |
| 6,089,453 | A | 7/2000 | Kayser et al. |
| 6,094,654 | A | 7/2000 | Van Huben et al. |
| 6,108,004 | A | 8/2000 | Medi |
| 6,111,578 | A | 8/2000 | Tesler |
| 6,112,202 | A | 8/2000 | Kleinberq |
| 6,134,706 | A | 10/2000 | Carey et al. |
| 6,137,499 | A | 10/2000 | Tesler |
| 6,237,499 | B1 | 5/2001 | McKoy |
| 6,249,768 | B1 | 6/2001 | Tulskie, Jr. et al. |
| 6,259,451 | B1 | 7/2001 | Tesler |
| 6,285,366 | B1 | 9/2001 | Ng et al. |
| 6,292,830 | B1 | 9/2001 | Taylor et al. |
| 6,327,551 | B1 | 12/2001 | Peterson et al. |
| 6,377,259 | B1 | 4/2002 | Tenev et al. |
| 6,396,488 | B1 | 5/2002 | Simmons et al. |
| 6,411,936 | B1 | 6/2002 | Sanders |
| 6,496,208 | B1 | 12/2002 | Bernhardt et al. |
| 6,556,983 | B1 | 4/2003 | Altschuler et al. |
| 6,609,098 | B1 | 8/2003 | DeMarcken |
| 6,646,652 | B2 | 11/2003 | Card et al. |
| 6,738,736 | B1 | 5/2004 | Bond |
| 6,772,139 | B1 * | 8/2004 | Smith, III ............ 707/748 |
| 6,897,885 | B1 | 5/2005 | Hao et al. |
| 7,000,199 | B2 | 2/2006 | Steele et al. |
| 7,171,407 | B2 | 1/2007 | Barton et al. |
| 7,171,618 | B2 | 1/2007 | Harrington et al. |
| 7,257,588 | B2 | 8/2007 | Keith, Jr. |
| 7,346,529 | B2 | 3/2008 | Flores |
| 7,831,526 | B1 | 11/2010 | Crawford et al. |
| 7,932,907 | B2 | 4/2011 | Nachmanson et al. |
| 2002/0147626 | A1 | 10/2002 | Zagotta et al. |
| 2003/0069869 | A1 | 4/2003 | Gronau et al. |
| 2004/0039619 | A1 | 2/2004 | Zarb |
| 2004/0073442 | A1 | 4/2004 | Heyns et al. |
| 2004/0107131 | A1 | 6/2004 | Wilkerson et al. |
| 2004/0267785 | A1 | 12/2004 | Suontausta et al. |
| 2006/0161560 | A1 | 7/2006 | Khandelwal et al. |
| 2008/0291203 | A1 * | 11/2008 | Nachmanson et al. ....... 345/440 |
| 2009/0192809 | A1 | 7/2009 | Chakraborty et al. |

FOREIGN PATENT DOCUMENTS

| | | |
|---|---|---|
| EP | 0770967 | 5/1997 |
| EP | 0978989 | 2/2000 |
| WO | 93/20510 | 10/1993 |
| WO | 95/12161 | 5/1995 |
| WO | 97/21171 | 6/1997 |

OTHER PUBLICATIONS

Hightower et al. "Graphical Multiscale Web Histories: A Study of PadPrint".
Bederson et al. "A Zooming Web Browser".
Noik "Layout-Independent Fisheye Views of Nested Graphs".
Clark, J., "Customizing Common Controls" Sep. 1997: Dr. Dobbs Journal.
Coffee, Peter "SPSS More Than a Pretty Face" Feb. 1996 PC Week.
Furnas, George W., "Generalized Fisheye Views" 1986 Human Factors in Computing Systems CHI '86 Conference Proceedings.
Lamping, et al. "A Focus+Context Technique Based on Hyperbolic Geometry for Visualization Hierarchies" Xerox Palo Alto Research Center.
Kohavi, "Bottom Up Induction of Oblivious Read-Once Decision Graphs" European Conference on Machine Learning 1994.
Friedman et al. "Finding the Optimal Variable Ordering for Binary Decision Diagrams" ICCC Transactions on Computers, vol. 39, No. 5 May 1990.
Covaliu, Zvi, "Decision Analysis: Concepts, Tools and Promise" Fair Isaac White Paper.
Efron & Tibshirani, *An Introduction to the Bootstrap* (1993).
Brian R. Gaines, "Transforming Rules and Trees into Comprehensible Knowledge Structures," Knowledge Discovery in Databases II. AAAI/MIT Press 1995.
Pook, Stuart, et al. "Context and Interaction in Zoomable User Interfaces," (ACM Press) pp. 227-231 & 317, May 2000, Palermo, Italy.
Sarkar et al. "Graphical Fisheye View of Graphs," ACM 1992.
Bederson et al. "Pad++: A Zoomable Graphical Interface for Exploring Alternative Interface Physics," ACM 1994.
Eiglsperger, et al., "An Efficient Implementation of Sugiyama's Algorithm for Layered Graph Drawing", Journal of Graph Algorithms and Applications, vol. 9, No. 3, pp. 305-325, 2005.
Kohavi et al., "Oblivious Decision Trees, Graphs, and Top-Down Pruning"; 1995;Intl. Joint Conf. on Artificial Intelligence; 7 pages.
Payne et al., "An Algorithm for Constructing Optimal Binary Decision Trees", IEEE Trans. On Computers, vol. C 26, No. 9, Sep. 1977, pp. 905-916.
Sossa et al.; "Model Indexing;the Graph-Hashing Approach"; 1992; IEEE; IEEE Computer Society Conference on Computer Vision and Pattern Recognition; pp. 811-814.

* cited by examiner

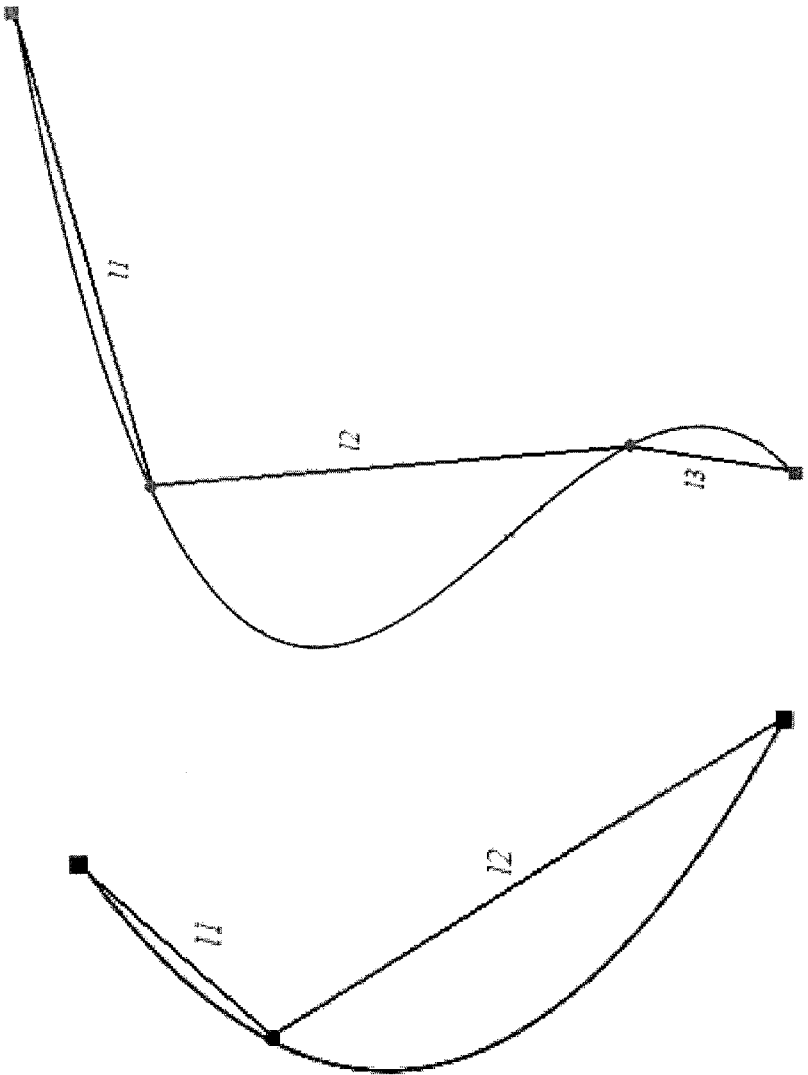

TECHNIQUES FOR DRAWING CURVED EDGES IN GRAPHS

BACKGROUND

This disclosure relates generally to data processing, and more particularly to techniques for drawing curved edges in graphs.

Graphs are used to represent information in many disciplines such as software applications, communication networks and web data analysis. Well-drawn graphs make it easy to visualize and comprehend the represented information. The term "Aesthetics of Graph" is used herein to refer to the how well a graph's nodes are laid out and its edges are drawn.

Edge drawing is an important part of graph aesthetics. An edge is considered aesthetically better if it is easy to follow (i.e. trace), but often nodes obstruct the straight line route for the edges. To keep the edges straight, it is not acceptable to shift the nodes and compromise on the graph compactness. So there is a need to draw curved edges rather than straight edges. Based on hand-made drawings, it is observed that the following principles lead to aesthetically better curved edges:

- Draw smooth edges and avoid sharp edge bends
- Minimize edge crossings and congestion.
- Keep edges short and reduce the curvature as much as possible It is difficult to optimize all of above aesthetics goals simultaneously. In fact, it is computationally intractable to minimize edge crossings or to draw edges that make the graph symmetric. For an algorithm to be useful in interactive application, the necessary computation for edge drawing has to be done in real-time.

Edge drawing is one of the most fundamental problems in Graph Drawing and there have been many papers published in this field. Edge drawing algorithms can be categorized into two groups. In the first group, edges are drawn at the time of laying out nodes, such as using Force Directed techniques. These techniques work well for very small graphs, but fail to perform well for larger graphs. These algorithms use the location of already drawn edges to determine the location of nodes laid out later. This limitation rules out the possibility of using these algorithms in interactive environments, where a user can specify or change the node locations.

In a second group of algorithms, the edges are routed after all the nodes have been laid out. There are two basic edge types that are used in general, namely, polyline (straight line and orthogonal being its special cases) and curved. As discussed earlier, straight line drawings cannot always avoid intersection of edges with nodes. Orthogonal drawings are not very compact and become completely incomprehensible in large graphs. Polyline edges are not smooth, hence are not considered good aesthetically. The smooth curves, as they are drawn in handmade drawings, are considered to be visually most appealing.

A general approach for drawing a smooth curve is to compute a piecewise linear path unobstructed by nodes and then to smoothen it out using Bezier curves. This approach has been used in several conventional algorithms such as Dag, dot, and router, but still these algorithms have several limitations. These algorithms are very heavily biased towards computing the shortest possible curved route. This often results in a large number of bends and turns in the piecewise linear path, which is seen in the final smoothened spline. A large number of bends and turns, even with small curvature, disrupts the visual flow and makes it difficult to follow the nodes that these edges connect.

Most conventional algorithms do not try to minimize the intersection of edges by placing the curves suitably, and the algorithms (such as dot) that do minimize the edge intersections compromise on the curve length and result in very long and curvy edges. In addition, the computations take too much time.

Conventional algorithms try to maximize on one or two of the aesthetic principles while ignoring the others. This creates the need for techniques that can create smooth curved edges and also satisfy various aesthetics principles at the same time.

SUMMARY

In general, this document discusses a system and method for drawing curved edges in graphs. This document presents a heuristic algorithm to draw curved edges in graphs using Bezier curves. The algorithm assumes that every pair of nodes has a unique edge between them. It also assumes that the graph is "leveled," which means the nodes can be grouped such that all the nodes in a group are laid out at the same y location in a vertical layout. Any generic graph can be converted to a leveled graph, so the techniques described in the algorithm are applicable to any graph.

The following improvements to existing curved edge drawing algorithms are presented:

Proposed heuristic for curved edge drawing computes quadratic and cubic curves only. Quadratic curves have at most one bend while cubic curves may have at most two. Higher degree curves have large number of "bends/turns" and hence are difficult to follow. On the other hand the heuristic is capable of computing higher degree curves while keeping the other benefits of the novel techniques described here.

A cost function is used to evaluate all possible candidate curves based on: intersection with nodes; intersection with edges, degree of the curve (number of inflection points); and/or curviness of the curve (maximum distance of any point on the curve from the straight line joining the end points).

The edges are sorted in an order using their lengths and their intersections with nodes. When edges are laid out using this order, the resulting layout has a lesser number of edge intersections than a randomly chosen order.

The heuristic can be used in an interactive mode when it is required to draw few edges that are affected by the movement of other nodes.

In accordance with a particular implementation, a computer-implemented method for drawing curved edges in graphs is presented. The method includes receiving input information into a computer processing system, the input information representing a plurality of nodes and edges related to a graph, and computing, using a computer processor of the computer processing system, one or more bridges, candidate quadratic and cubic curves, and a cost function for the graph to iteratively evaluate two or more curves drawn to depict the graph. The cost function is based on, for each curve of the two or more curves, an intersection with the plurality of nodes, an intersection with the edges, a number of inflection points, and a maximum distance of any point on the curve from a straight line joining end points of the curve. The method further includes determining a selected curve from the two or more curves having a lowest cost based on the cost function In another implementation, a system for drawing curved edges in graphs is presented. The system includes a computer processor, and code implemented in a tangible medium for instructing the computer processor. The code includes instructions to receive input information into a computer processor, the input information representing a plurality of nodes and edges related to a graph. The code further includes instructions to compute one or more bridges, candidate quadratic and cubic curves and a cost function for the graph to iteratively evaluate two or more curves drawn to depict the graph, the cost function being based on, for each curve of the two or more curves, an intersection with the plurality of nodes, an intersection with the edges, a number of inflection points, and a maximum distance of any point on the curve from a straight line joining end points of the curve. The code further includes instructions to determine a selected curve from the two or more curves having a lowest cost based on the cost function.

In yet another implementation, a computer-implemented method for drawing curved edges in graphs is presented. The computer-implemented method includes the steps of receiving input information representing a plurality of nodes and edges related to a graph into a computer processing system, and computing, using a computer processor of the computer processing system, two or more curves based on the plurality of nodes and edges. For each curve in the two or more curves, the computer processor is configured for computing one or more bridges, generating candidate quadratic and cubic curves; and computing a cost function to evaluate each curve against a maximum acceptable cost for the graph. The method further includes determining a selected curve from the two or more curves having a lowest cost based on the cost function.

The details of one or more implementations are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 depicts a quadratic curve.

FIG. 2 depicts a cubic curve.

Like reference symbols in the various drawings indicate like elements.

DETAILED DESCRIPTION

Figure 4:
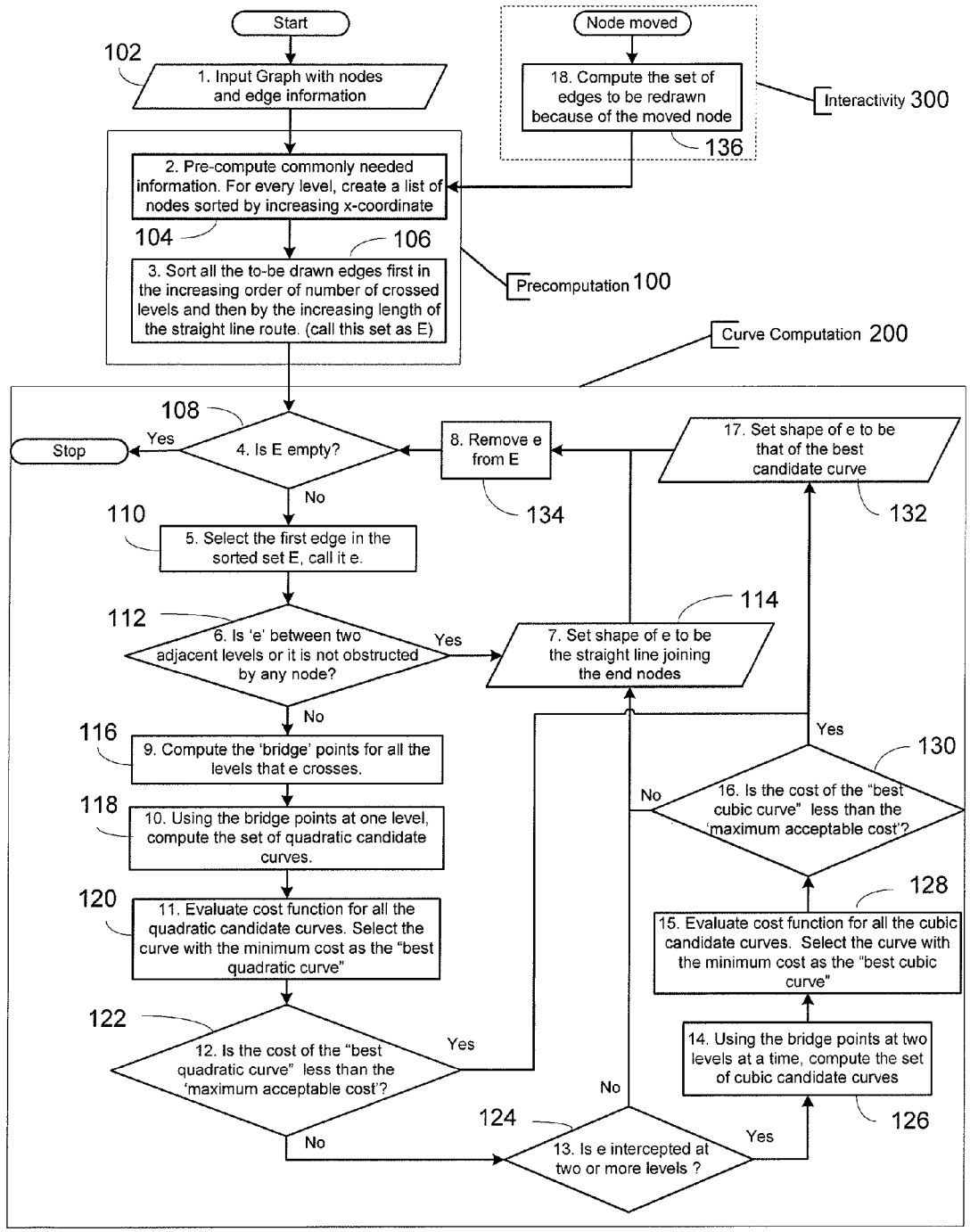
FIG. 4 is a flowchart of a heuristic algorithm in accordance with preferred implementations.

This document describes a heuristic algorithm for drawing curved edges in graphs, and which can be implemented in a data processing system or in a method for drawing curved edges. FIG. 4 is a flowchart of a heuristic algorithm in accordance with preferred implementations, and which serves as a reference for the description of various implementations as described below.

The algorithm is described for a vertical layout. A leveled layout is called vertical when nodes at a given level have same vertical location or y-coordinate. The same steps can be applied for horizontal layout (defined similarly) by simply interchanging the uses of x and y-coordinates.

With reference to FIG. 4, at 102 the input for the heuristic algorithm is a leveled graph where the node locations are already assigned. In a leveled graph, nodes can be grouped such that all the nodes in a group have to be laid out at the same y location in vertical layout. The output includes edges with shapes assigned to them (either straight lines or curves) as per the input layout of nodes.

Pre-Computation 100

In a first pre-computation step, at 104, common information needed for layout of all edges is pre-computed. This includes a list of nodes at any given level sorted by increasing x-coordinate value. This step is optional, but it avoids repeated computation of the same information required during individual edge drawing. In a second pre-computation step, at 106, all the edges are sorted in the increasing order of number of levels crossed/obstructed. For multiple edges with the same number of crossed/obstructed levels, a shorter edge is put before a longer edge. Subsequently, when the edges are drawn using the above sorted order, step 106 reduces the number of edge crossings when compared with edges drawn in random order. The rationale behind this sorting is as follows: an edge with no obstruction should be drawn first, so that it can be drawn as a straight line. A straight line is the easiest to comprehend amongst all shapes, if not obstructed by a node. Further, more flexibility is available to draw longer edges and hence a larger number of candidate curves are available in such cases. Drawing shorter edges before longer edges increases the possibility of finding an overall better solution.

Curve Computation 200

Once the edges are iterated in the sorted order, a set of "Curve Computation Steps" 200 are performed for every edge. These steps return the exact shape (with location) for every edge. One iteration of the Curve Computation Steps 200 leads to computation of shape for one edge (an element of the set defined herein as "E"), and are used to compute the shape for a single edge using Bezier curves. A Bezier quadratic/cubic curve can be defined using a pair of end points and one/two interpolation points respectively. The end points are the coordinates of the source and destination nodes of the edges.

At 108, it is determined if E is empty. If yes, shape of all edges is computed and the algorithm stops. If no, at 110, the first edge in the sorted set E is selected. At 112, it is determined whether an edge e from set "E" is between two adjacent levels or is not obstructed by any node. If the straight line joining the end points is not obstructed by any node, the straight line path is chosen for that edge, at 114. Edges that connect nodes at consecutive levels can not be obstructed by other nodes, so they are always drawn as straight lines.

If the edge connects nodes that are not in consecutive levels, the edge is said to be crossing levels. When an edge crosses one or more levels and the straight line joining the end points is obstructed by at least one node, the following steps are used. For each crossed level, possible points are determined from which that edge can be routed. Such points are referred as 'bridges'. This bridge computation step 116 is described in further detail below. Candidate quadratic curves are generated by interpolating between the end-points and bridges using a Candidate generation sub-step 118, as described further below. For a quadratic curve, only a single bridge point is considered at a time.

For each candidate curve, a 'cost function' value is evaluated using a Cost function evaluation sub-step 120. The cost function takes into account various aesthetic principles and is defined such that a smaller value means a better curve. Thus, the best curve amongst the candidate curves is the one with the minimum value of the cost function and we will refer this as "best quadratic curve." At 122 it is determined whether the "best quadratic curve" has value of the cost function below a certain threshold (called 'maximum acceptable cost'). If yes, no further candidate curves are generated and the shape that had the minimum value of the cost function is returned at step 132. Otherwise the process proceeds to step 124. The default value of 'maximum acceptable cost' is based on empirical results and can be also specified by user.

At 124, it is determined whether the edge crosses two or more levels, and if so cubic candidate curves are considered. Otherwise, the method proceeds to step 114. The bridges for the crossed levels are already computed. The remaining procedure is similar to that mentioned in steps 112-122, with the only difference being that it is done for cubic curves instead of quadratic curves. For a cubic curve, a pair of bridges is interpolated at 126 instead of single bridge. Thus, two of the crossed levels are selected for computing the bridges, which are then used for generating candidate cubic-curves at 128. At 130, the cost of the "best cubic curve" is evaluated to determine if it is less than the "maximum acceptable cost." If the "best cubic curve" amongst the candidates meets the 'maximum acceptable cost', its shape is returned as output at 132.

If no results are achieved after performing the aforementioned steps, i.e. even the best curve doesn't meet the 'maximum acceptable cost', then it is assumed that 'no good curved path exists' for this edge and it is better to just draw the edge as a straight line at 114. Thus, a straight line joining the end points is returned.

Bridge Computation Sub-Step 116.

Bridges are computed for every edge and for every level that edge crosses. A 'bridge' can be any point in the empty space between the ends of two adjacent nodes of the same level. There can be infinitely many bridge points because of the continuity of the open spaces between the nodes. Only a few representative bridge points are selected that have a potential to give better curves as described below. The sorted list of nodes computed in the first preprocessing step is used for bridge computation.

For every open space between two adjacent nodes, if the width of the open space is greater than a 'minimum bridge width', then the 'bridges' in this open space are ignored. This check is done to partially ensure that the curve has enough space to pass through the level without intersecting the nodes. The 'minimum bridge width' is defined empirically and is dependent on the node height and layout orientation. Bridge points that are farther than a defined threshold distance from the point on the same level that is on the straight line joining the end points are not considered. This threshold is preferably chosen to be half of the distance between the end-points. This is done to ensure that the candidate curves that are generated are not too long. When bridges are chosen at the extreme left or right side of a level, four bridges are chosen such that they are at distances of 1, 2, 3 and 7 times the 'minimum bridge width' from the end node of that side.

Bridges in the open space between two adjacent nodes are chosen by first choosing two bridges at distances of half of the "minimum bridge width" from the ends of the nodes. Then, additional bridges are identified between these two bridges at distances that are integral multiples of half of 'minimum bridge width'. A curve passing through a bridge and joining the end points could still intersect the nodes adjacent to the bridge, if the straight line joining the end-points is not vertical. To account for this slope of the line, a small shift is given to the co-ordinate of the bridge. The greater the offset of the slope from the vertical, the greater is the shift applied (up to a theoretical maximum of half of the height of a node).

Figure 3:
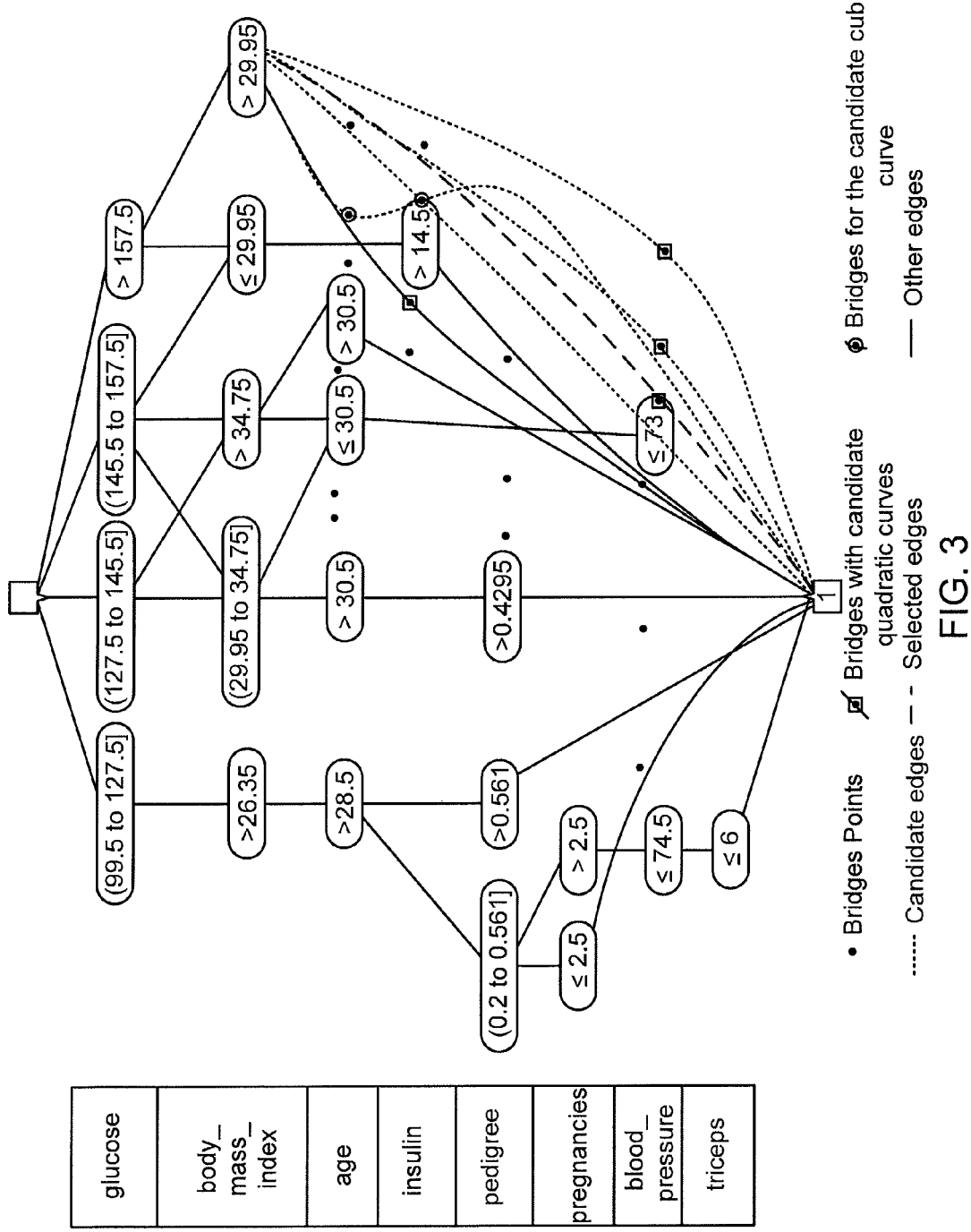
FIG. 3 illustrates an example showing bridges, some candidate curves, and the selected edge.

The circular dots in the exemplary curve shown in FIG. 3 represent some of the bridges. It can be seen that bridges are not computed for the level 'blood pressure' since no node on that level is within the threshold distance from the point of intersection of the straight line edge with the level.

Candidate Curve Generation Sub-Step 118 and 126.

A candidate quadratic/cubic curve interpolates between the end points and the bridge(s). The mathematical equation for the curve requires the value of a parameter for each of the interpolation points. The source and target nodes have the parameter values 0 and 1 by default. The remaining interpolation point(s) between them have the parameter value between 0 and 1.

The value of these parameter(s) determines the smoothness of the resulting curve. The computation for maximum smoothness is intensive. However, an approximation can be used. The approximate parameter values for a bridge is the length of piecewise linear path from source endpoint to the bridge point divided by the length of the complete piecewise linear path between the source end point, bridge(s) and target end point. In mathematical terms, for quadratic curves, in FIG. 1:

$$t = l_1/(l_1+l_2)$$

While for cubic curves, in FIG. 2, $$t_1 = l_1/(l_1+l_2+l_3)$$

$$t_2 = (l_1+l_2)/(l_1+l_2+l_3)$$

This step corresponds to step 118 for quadratic curves and step 126 for cubic curves.

In FIG. 3, the circular dots surrounded by squares denote the bridges for which quadratic candidate curves (dotted lines) are shown. The dots surrounded by circles are the two bridges used to draw a cubic candidate curve (which might not be needed to be generated since a quadratic curve which met the maximum acceptable cost was available). The selected curve out of all candidate curves is shown with a dashed line. Other edges that have already been drawn are shown with solid lines.

Cost Function Evaluation Sub-Step 120 and 128

For every candidate curve, a 'cost function' is evaluated and the candidate curve with the minimum value of the function is selected. The smaller the value of the function, the better the curve is expected to be in terms of aesthetics. The cost function is dependent on four parameters at present: 1) a number of nodes intersecting the curve; 2) a number of edges intersecting the curve; 3) a degree of the curve (number of inflections), i.e. the less the number of bends or turns in the curve, the more comprehensible it is; and 4) a flatness of the curve. Flatness of a curve is defined as the maximum distance of any point on the curve from the line joining the end points. Each of these measures is quantifiable. The exact value related to each measure can be very different in terms of scale, and requires normalization. To normalize these values, each one is multiplied by different scaling constants to make them comparable with each other.

To calculate the overall cost function value, the individual normalized values are added. Depending on the nature of application, some measures may be relatively more important than others. This can be accounted by taking a function of these measures instead of the measures themselves and multiplying each value by a constant weight. Following long edges may be perceived as being more difficult as compared to intersections with other edges, while some other people might feel the exact opposite. The values for these constants weights can be specified by the user as per their personal preference. The ability to customize results as per user's preference makes the algorithm flexible and user driven. In some implementations, a set of values for these constants obtained through empirical testing with different graphs can be provided.

The mathematical equation for the cost function can be expressed as:

$$\text{Cost Function} = \Sigma^4_{i=1} S_i * W_i * f(p_i)$$

where:

Σ denotes the summation $p_i$ corresponds to a different parameter for each value of i. We have four parameters as mentioned above, thus, i varies from 1 to 4.

$S_i$ represents the scaling factor for the parameter $p_i$ $W_i$ represents the weight factor (user-specified or default) for the parameter $p_i$.

This step corresponds to steps 120 and 128 in FIG. 4.

Interactivity 300

In an interactive application, the user has the control to change to coordinates of the nodes manually at 136. Since the cost functions of curves are dependent on the location, shape, and size of source node, destination node, interpolation points and other nodes, any changes to these require recomputation which can result in a different solution curve. This interactivity ensures that the displayed edges conform to the current layout of nodes.

The algorithm as depicted in FIG. 4 is computationally efficient, and can be used incrementally. When a node is moved, the set of affected edges is calculated at 134. This set includes the edges that had the relocated node as their source or target node or those edges that crossed the level of the relocated node, whether obstructed or not. The shapes for this set of edges can be computed by repeating the same steps as mentioned earlier for the complete set of edges. Besides, since the heuristic lays out the edges independently of each other, it is not required to compute the shapes of all the edges again. This incremental nature allows for easy interactivity.

Some or all of the functional operations described in this specification can be implemented in digital electronic circuitry, or in computer software, firmware, or hardware, including the structures disclosed in this specification and their structural equivalents, or in combinations of them. Implementations can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate implementation, may also be provided in combination in a single implementation. Conversely, various features which, for brevity, are described in the context of a single implementation, may also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations of the invention have been described. Other implementations are within the scope of the following claims. For example, the steps recited in the claims can be performed in a different order and still achieve desirable results. In addition, implementations of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A method comprising:
receiving, by at least one processor, fixed positions of a plurality of nodes of a graph, the plurality of nodes and the fixed positions being always unadjustable so as to maintain compactness of the graph;
determining, by at least one processor, two or more curves to connect corresponding pairs of nodes of the plurality of nodes;
selecting, by at least one processor and based on a cost function and from the two or more curves, optimal curves for the corresponding pairs of nodes, the cost function for each curve being based at least on a distance of a farthest point on a curve from a straight line joining end points of the curve, the end points of the curve being positions of nodes to be connected by the curve; and
connecting, by at least one processor when a possible connecting of the corresponding pairs of nodes via respective straight lines results in more edge crossings than possible edge crossings associated with the optimal curves, the plurality of nodes by using the corresponding optimal curves, two or more connected nodes being connected to at least two other corresponding nodes.

2. The method of claim 1, wherein:
the two or more curves are determined for each pair of nodes of the plurality of nodes;
an optimal curve of the optimal curves is selected for each corresponding pair of nodes;
each pair of nodes is connected by a corresponding optimal curve of the optimal curves; and
each connected node of the two or more connected nodes is connected to at least two other nodes.

3. The method of claim 1, wherein the cost function is evaluated after the nodes become unadjustable.

4. The method of claim 1, wherein the nodes maintain orientation with respect to other nodes after the nodes are adjusted once and until the connecting is performed by the optimal curves so as to maintain the compactness of the graph.

5. The method of claim 1, further comprising:
rendering, by at least one processor, the connected plurality of nodes and the corresponding optimal curves in an output device.

6. The method of claim 1, wherein the optimal curves are associated with a maximum acceptable value of the cost function.

7. The method of claim 1, wherein at least one of the optimal curves is a cubic curve.

8. The method of claim 1, wherein at least one of the optimal curves is a quadratic curve.

9. A non-transitory computer program product storing instructions that, when executed by at least one programmable processor, cause the at least one programmable processor to perform operations comprising:
receiving fixed positions of a plurality of nodes of a graph, the plurality of nodes and the fixed positions being unadjustable after being fixed once so as to maintain compactness of the graph;
determining two or more curves to connect corresponding pairs of nodes of the plurality of nodes;
selecting, based on a cost function and from the two or more curves, optimal curves for the corresponding pairs of nodes, the cost function for each curve being based at least on a distance of a farthest point on a curve from a straight line joining end points of the curve, the end points of the curve being positions of nodes to be connected by the curve; and
connecting the plurality of nodes by using the corresponding optimal curves when a connecting of the corresponding pairs of nodes via respective optimal curves results in less intersections of the corresponding optimal curves than intersections of respective straight lines if the corresponding pairs of nodes were to be connected via the respective straight lines instead of the corresponding optimal curves, two or more connected nodes being connected to at least two other corresponding nodes.

10. The computer program product of claim 9, wherein the cost function is evaluated after the nodes become unadjustable.

11. The computer program product of claim 9, wherein the nodes maintain orientation with respect to other nodes after the nodes are adjusted once and until the connecting is performed by the optimal curves so as to maintain the compactness of the graph.

12. The method of claim 1, wherein the unadjustable fixed positions of the nodes are located in a plurality of levels such that the connected plurality of nodes are arranged in the plurality of levels, the connected plurality of nodes displaying data specifying corresponding ranges for values of a plurality of health parameters, two or more health parameters being associated with a plurality of corresponding nodes at each corresponding level.

13. The method of claim 12, wherein the plurality of health parameter comprise glucose, body mass index, age, insulin, pedigree, pregnancies, blood pressure, and triceps.

14. The computer program product of claim 9, wherein the connected plurality of nodes are arranged in different levels associated with respective health parameters comprising data associated with one or more of: glucose, body mass index, age, insulin, pedigree, pregnancies, blood pressure, and triceps.

* * * * *